UNITED STATES PATENT OFFICE.

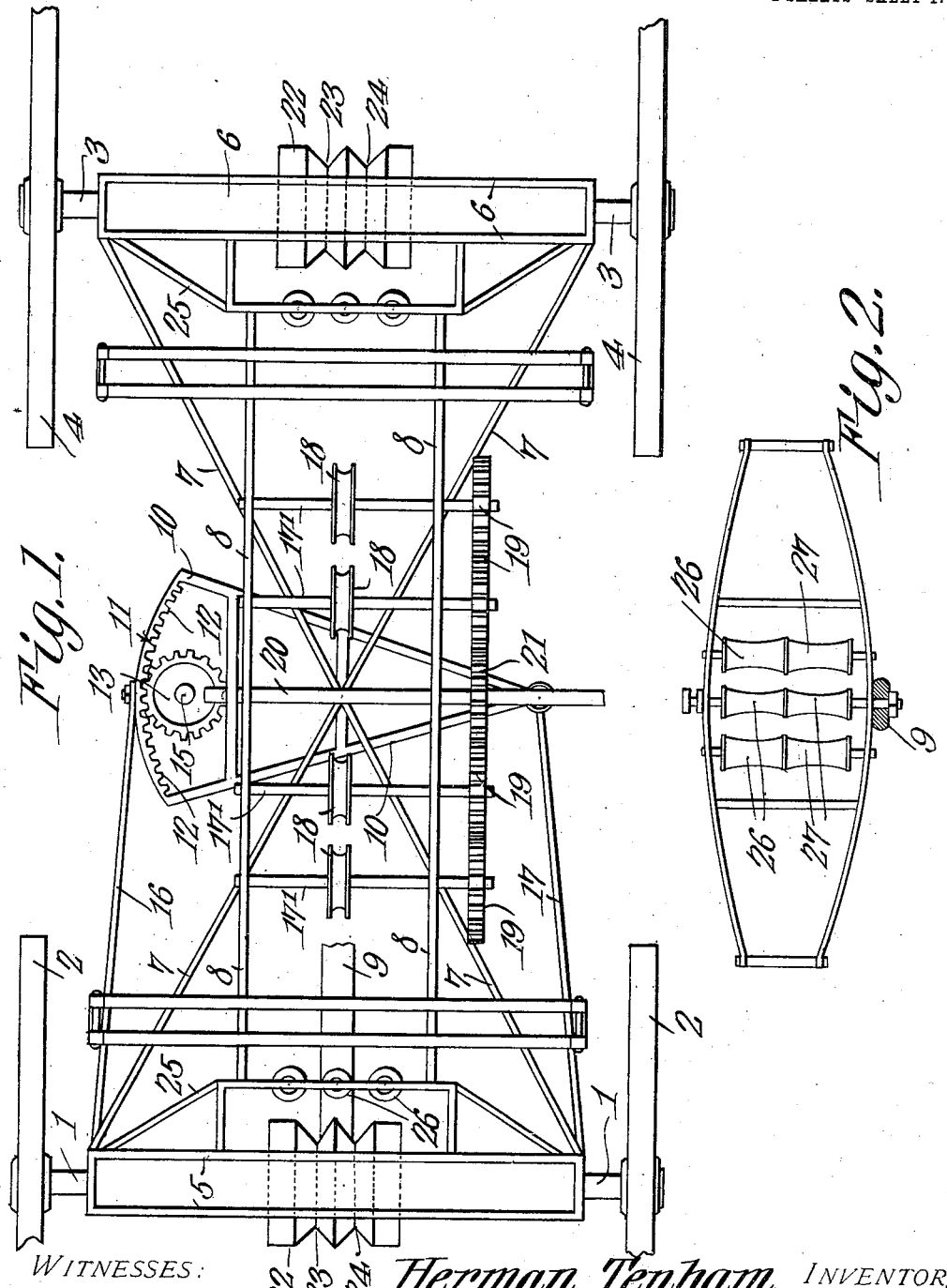

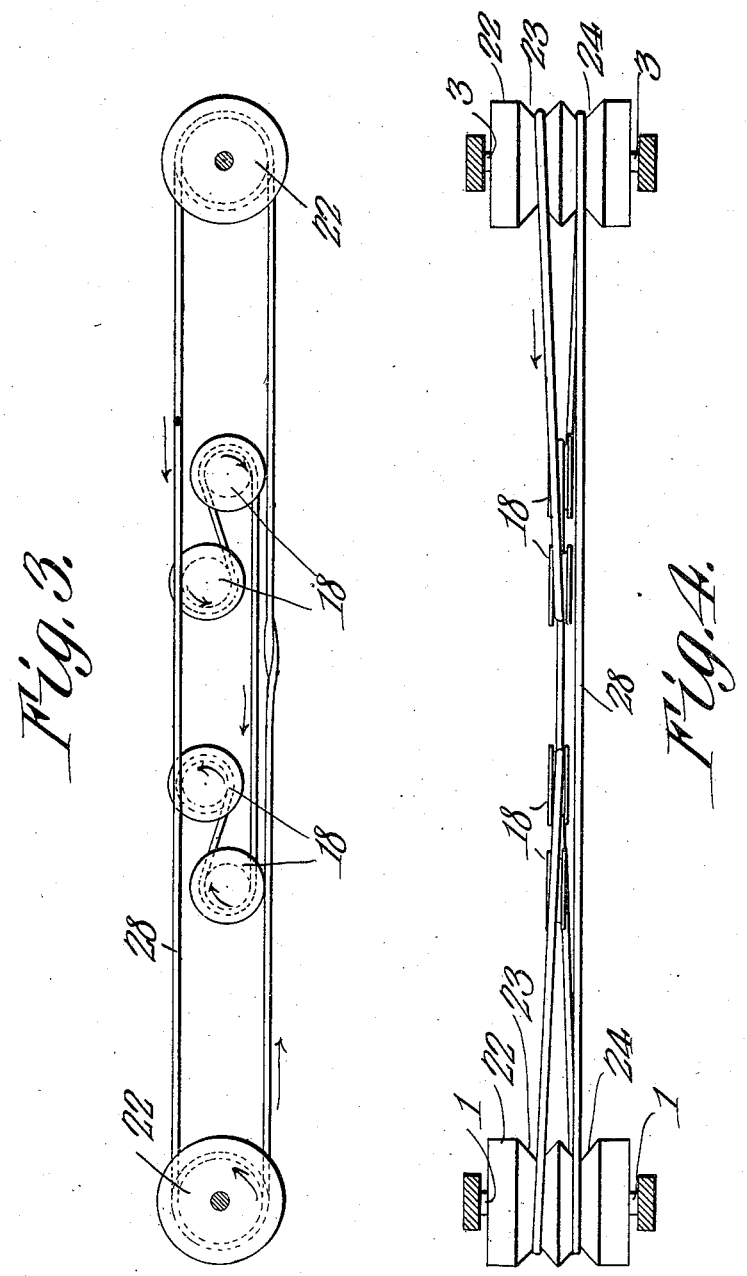

HERMAN TENHAM, OF BRANDON, WISCONSIN.

DRIVING-GEAR FOR AUTOMOBILES.

No. 861,332.

Specification of Letters Patent.

Patented July 30, 1907.

Application filed January 24, 1907. Serial No. 353,920.

*To all whom it may concern:*

Be it known that I, HERMAN TENHAM, a citizen of the United States, residing at Brandon, in the county of Fond du Lac and State of Wisconsin, have invented a new and useful Driving-Gear for Automobiles, of which the following is a specification.

This invention has reference to improvements in driving gear for automobiles, and its object is to provide a flexible driving gear wherein frictional contact is employed for imparting motion from the prime mover carried by the vehicle to both front and rear wheels and to maintain this frictional driving gear in good frictional contact whether the vehicle be moving in a straight path or around a curve.

It is a further object of the invention to provide a steering means for the steering wheels of the vehicle especially adapted for use with a driving gear constructed in accordance with the present invention.

The invention consists in a series of sheaves mounted upon the running gear of the vehicle and upon both axles and arranged to receive an endless rope or cable so interwoven with the sheaves as to provide large frictional engagement therewith and to permit of the turning of the steering wheels to cause the vehicle to move in a curved path without relaxing the frictional engagement of the transmitting cable with the sheaves.

The invention also consists in a steering mechanism connected to the steering axle so arranged that one of the trucks may be turned for steering without interference with the transmitting gear constituting a part of this invention.

The invention will be fully understood from the following description taken in connection with the accompanying drawings forming a part of this specification, in which,—

Figure 1 is a plan view, in part diagrammatic, of an automobile running gear provided with mechanism constructed in accordance with my invention; Fig. 2 is an end view, with parts in section, of the guide roller supports; Fig. 3 is a side view, partly in section, of the cable sheaves and endless cable carried thereby; and Fig. 4 is a plan view, partly in section, of the same.

Referring to the drawings, there is shown a front steering axle 1 for driving the wheels 2 fast thereon, and a rear axle 3 for driving the wheels 4 fast thereon. The two axles are mounted upon a frame consisting of a front cross-beam 5, a rear cross-beam 6, diagonal brace rods 7, and longitudinal spaced bars 8—8 together with a reach 9. The rear cross-beam 6 supports the rear axle 3 so as to maintain the same in line with the frame, the journal boxes for the axle not being shown. The front axle 1 may be mounted to turn upon a vertical axis in any approved manner in the front portion of the running gear frame, and this turning of the axle upon a vertical axis may be under the control of the steering gear. In the present instance, the steering mechanism is shown as in the form of a triangular frame 10 moving about a vertical axis coincident with the crossing of the two bars 7 and 8, and this vertical axis may be supported by the reach 9. The wide end 11 of the triangle 10 is curved on an arc of which the pivotal point of the triangle is the center, and on the inner side this wide curved portion 11 is formed with gear teeth 12. Meshing with these gear teeth 12 is a pinion 13 supported from some fixed portion of the running gear and having a vertical shaft 15 extended and connected for operation to a point within reach of the operator of the automobile. From the center of the curved portion 11 of the frame 10 there is a link 16 connected in any suitable manner to the front axle 1, and another link 17 extends from the other end of the triangle 10 on the other side of its pivotal point and is also connected in any suitable manner to the front axle 1.

Journaled in the longitudinal spaced bars 8 of the running gear frame, are a number of laterally-extending shafts 17, each of which has secured to it about midway between the two bars 8 a sheave 18. The shafts 17, of which there are four as shown in the drawings, all extend to one side of one of the bars 8 and there carry pinions 19, and centrally located with relation to these shafts 17 is another shaft 20, also journaled in the bars 8 and extending therebeyond and carrying a pinion 21. The shaft 20 projects beyond the pinion 21 and is there put into communication with the motor carried upon the vehicle; but as this motor and its connections to the shaft 20 form no part of the present invention, such motor and such connections have been omitted from the drawings.

The arrangement is such that, as shown in the drawings, the shaft 20 is located midway of the space between the two axles 1 and 3, and there are two shafts 17 on each side of this drive shaft 20 and the pinions 19 of each pair of shafts 17 mesh with each other, and the pinion 21 meshes with the pinions 19 of each pair adjacent to the said pinion 21. Power transmitted to the shaft 20 will be imparted to each pair of pinions 19 and therefrom to the shafts 17 and sheaves 18 carried by the latter, so that each sheave 18 nearest the shaft 20 will have the same direction of rotation, and each sheave 18 remote from the shaft 20 will have the same direction of rotation but opposite to that of the other two sheaves 18. It will be observed that the four sheaves connected to the shaft 20 are arranged in the same longitudinal plane.

Upon each axle there is fast a sheave 22 having two grooves 23—24 arranged side by side, and upon a frame 25 in front of the rear axle 3 and behind the front axle 1 are two series of pulleys 26—27 mounted upon vertical spindles. There are two series of three pulleys each, one above the other, adjacent to each sheave 22, and these pulleys are shaped as shown to constitute guide pulleys, as will hereinafter appear.

Interwoven throughout the system of pulleys is an endless cable or rope 28 which, starting, say, at the groove 23 of the rear sheave 22, may be traced as follows: From the sheave 22 the cable passes over and around the sheave 18 nearest to and at the rear of the shaft 20, thence backward up and around the rearmost sheave 18, thence below the same and to the under side of the foremost sheave 18, thence up and around the same and rearward under the sheave immediately in front of the shaft 20, thence to the upper side of the groove 23 of the sheave 22 of the front axle, around said sheave and backward and under the sheave 22 on the rear axle to the groove 24 thereof, and up and around the same forward over and around the sheave 22 of the front axle by way of the groove 24, and again returning to the groove 23 of the sheave 22 on the rear axle to the starting point. It will be seen from this that the cable engages more than half the bottom of the grooves in each sheave 18, and that it has a large bearing surface in each sheave 22, since it engages two grooves in each sheave, and that any movement of the sheave 22 of the front axle around the axis of the king-bolt, which axis is coincident with the vertical diameter of the sheave 22 at a point midway between the two grooves 23—24, will not slacken the cable for the reason that any slackening that might be caused by the approach of one groove of the sheave 22 toward the sheaves 18 will be taken up by the other groove of the said sheave. Therefore, with this transmission gear the axle may be turned for steering purposes to any extent without causing any slackening of the cable, and, consequently, under all conditions of travel the frictional engagement between the sheaves and cable will remain constant.

The cable 28 is passed between the guide rollers 26 27 both as it approaches and leaves the grooves 23—24 of the sheaves 22, and while these guide rollers have been omitted from Figs. 3 and 4, showing the manner of guiding the cable through the sheaves, their mode of operation will be clearly apparent from these figures taken in connection with Figs. 1 and 2.

While I have described a certain order of interweaving of the cable with the sheaves, it is to be understood that any other manner of weaving the cable therethrough which will cause the cable to pass over the several sheaves in the proper order to drive the mechanism may be employed.

It will be understood, of course, that the rope drive may be provided with an automatic take-up for the slack, but as this is a common expedient, it need not be shown nor further described.

I claim:—

1. A driving gear comprising a set of sheaves all arranged in one longitudinal plane, interconnections between the sheaves of said set, other sheaves at each end of the interconnected set and arranged in the same general longitudinal plane as the said interconnected sheaves, and an endless cable entirely carried by and interwoven in proper sequence over all the sheaves.

2. A driving gear comprising an interconnected set of single sheaves, all in the same general plane; other double sheaves, one at each end of the set of interconnected sheaves and arranged in the same general longitudinal plane as the single sheaves; and an endless cable entirely carried by and interwoven in proper sequence through all the sheaves.

3. A driving gear comprising a drive shaft, single sheaves connected to said shaft, other double grooved sheaves, and an endless power-transmitting cable entirely carried by and interwoven in proper sequence through all the sheaves.

4. A driving gear comprising a longitudinal series of single sheaves, all in one longitudinal plane, a drive shaft, a gear wheel on the drive shaft, a shaft for each sheave, gear wheels on each shaft connected to the gear wheel on the drive shaft, other double grooved sheaves, and an endless cable entirely carried by and interwoven in proper sequence through all the sheaves.

5. In an automobile, driving gear therefor comprising suitable driven axles, a double groove sheave fast on each axle, a series of single, interconnected sheaves, a drive shaft for receiving motion from the prime mover of the automobile, connections between the drive shaft and the interconnected sheaves, guide rollers between the driving sheaves and the double groove sheaves, and an endless cable entirely carried by and interwoven through all the sheaves and through the guide rollers in proper sequence.

In testimony that I claim the foregoing as my own, I have hereto affixed my signature in the presence of two witnesses.

HERMAN TENHAM.

Witnesses:
J. W. FOSTER,
T. R. SCHWOND.